Feb. 11, 1947. S. YAROSH 2,415,550

STEREOSCOPIC EFFECT MOTION PICTURE FILM DEVICE

Filed March 9, 1945

INVENTOR.
STANLEY YAROSH
BY
ATTORNEY.

Patented Feb. 11, 1947

2,415,550

UNITED STATES PATENT OFFICE 2,415,550

STEREOSCOPIC EFFECT MOTION-PICTURE FILM DEVICE

Stanley Yarosh, New York, N. Y.

Application March 9, 1945, Serial No. 581,738

1 Claim. (Cl. 88—16.6)

This invention relates to new and useful improvements in projecting devices for motion picture film, and has more particular reference to a device for projecting three dimensional effects from standard motion picture film.

More specifically, the invention proposes the construction of a device as mentioned above, which is characterized by a motion picture film projector associated with means for polarizing adjacent frames of film used in said projector, in different directions, and on throwing said adjacent frames in slightly laterally offset positions on a "metallic" surface screen for viewing with a polarized viewer. In accordance with this invention, the adjacent frames of film may be one beneath the other, or they may be adjacent side by side.

A prism or reflecting system may, or may not be used in combination with the projecting device, depending merely upon design. If the adjacent frames are arranged one beneath the other, then the prism or reflecting system may be eliminated if the image relationship is predetermined on the film. The use of a prism or reflector system is necessary to bring the two side adjacent scenes to the proper relationship. They must be laterally offset a distance substantially equal to the distance between human eyes.

The invention also proposes a device for projecting three dimensional effect pictures from standard film characterized by a standard motion picture film projector provided with an endless belt of polarized film mounted within the loop of the standard film which passes through the gate and across the aperture of the projector. It is further proposed that said endless belt of polarized film engage around the sprocket wheels guiding the standard film. The endless belt of film may be arranged inside, or outside of the standard film.

The invention further proposes that said polarized film be provided with frames aligned with the frames of the standard film at the aperture of the projector, and that alternate frames of said polarized film being polarized in direction, and the remaining frames in another direction. A reflector or prism combination is proposed having polarizing elements for selecting said polarized frames and throwing adjacent frames in slightly laterally offset positions relative to each other.

The invention proposes that the pictures be projected upon a "metallic" surface screen, and that they be viewed with a polarized viewer so that the selected frames polarized towards one side are viewed with one eye, and the frames polarized towards the other side are viewed with the other eye, whereby an effect is produced of a three dimensional motion picture.

Another object of the invention resides in so arranging the device that it may be applied as an attachment for any standard motion picture machine, professional or amateur.

Another object of the invention is the construction of a device as mentioned which is simple and durable and which may be manufactured and sold at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

Figure 1:
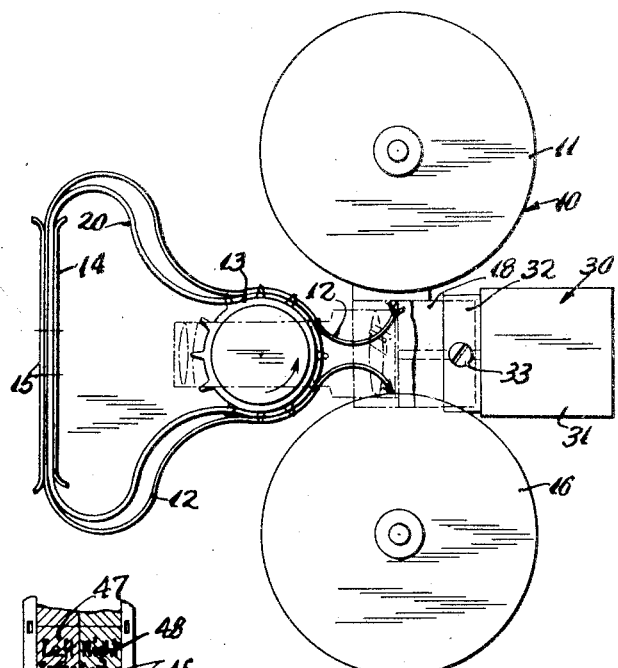
Fig. 1 is a fragmentary side elevational view of a motion picture film projector equipped with a device for projecting three dimensional effect pictures from standard motion picture film.
Figure 2:
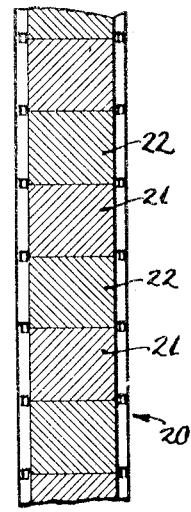
Fig. 2 is a fragmentary elevational view of a portion of the endless belt polarized film shown in Fig. 1.

The new and improved device for projecting three dimensional effect pictures from standard motion picture film, in accordance with this invention, includes a standard motion picture projector 10. The details of this projector will not be given in this specification since they form no part of the invention. Any type of motion picture projector may be used.

However, in order to better understand the new device it is pointed out that the motion picture projector 10 includes a feed reel 11 from which the standard motion picture film 12 is fed across a sprocket wheel 13 and then into a loop which extends through a gate 14 and across the aperture 15 of the projector. The standard film 12 then continues across the bottom of the sprocket 13 and continues upon a take-up reel 16. The projector 10 is also provided with the usual source of light (not shown) and the usual lens system, generally indicated by reference numeral 18.

The new device includes an endless belt 20 of polarized film mounted within the loop of the standard film 12 which passes through the gate 14 and across the aperture 15 of the projector and engages around the sprocket wheel 13. The belt of polarized film 20 is disposed inside or outside of the standard film 12, whichever is more convenient.

The polarized film 20 is provided with a plurality of frames 21 and 22 which are aligned with the frames 21' and 22' of the standard film 12 at the aperture 15. The frames 21 are alternate frames of the polarized film 20, and these frames are polarized in one direction, while the remaining frames 22 are polarized in the other direction. Preferably, these directions should be at right angles to each other, each arranged on an inclination of 45°.

It should be clear that other directions of polarization may also be used. Since the polarized film 20 passes across the aperture 15 together with the standard film 12, and since the frames of these films are aligned, the same effect is produced as though the frames 21' of the standard film were polarized in one direction, and the remaining frames 22' in the other direction.

Figures 5, 7:
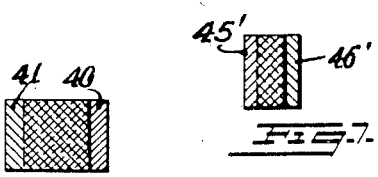
Fig. 5 is a schematic view showing the manner in which adjacent frames of the standard motion picture film will be projected on a screen in offset positions.
Fig. 7 is a schematic drawing of the manner in which the side-by-side adjacent frames of the film shown in Fig. 6 will be projected on a screen in offset positions.

An auxiliary lens system 30 is mounted upon the projector lens 18. This auxiliary lens system 30 includes a casing 31 provided with a mount 32 having a set screw 33 by which the casing may be readily mounted upon the casing of the projector lens 18. Within the casing 31 there is a broad prism 35 and a pair of narrow prisms 36 and 37. These narrow prisms 36 and 37 are aligned with the broad prism 35. The adjustable narrow prisms or reflectors 36 and 37 are provided with polarizing elements 38 and 39 for selecting said polarized frames from the moving picture film and throwing adjacent frames in slightly laterally offset relation with each other, as schematically illustrated in Fig. 5. In Fig. 5 one of the projections 40 polarized in one direction is shown slightly laterally offset of the other projection 41 polarized in the other direction.

The general term "prism" as used in this specification is intended as embodying its broadest meaning. It may be extended to include reflectors, or the like parts.

Figure 3:
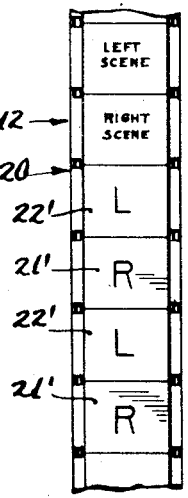
Fig. 3 is a fragmentary elevational schematic view indicating the way that the frames of the standard film are polarized in alternate directions.
Figure 4:
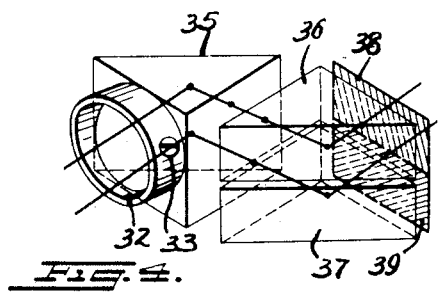
Fig. 4 is a fragmentary schematic view of the reflector or prism system which is mounted upon the lens of the motion picture film projector.

The operation of the device is as follows:

The motion picture projector 10 is operated in the usual fashion. The endless belt of polarized film 20 will have the effect of polarizing alternate frames of the standard film 12 in one direction, and the remaining frames in the other direction, as indicated in Fig. 3, in which the frames are correctly identified with the reference letters R and L, indicating polarized towards the right, or polarized towards the left.

The projector will project each polarized frame of the standard motion picture film 12 through the prism 35 and then through the prisms 36 and 37. The prisms 36 and 37 are adjustable slightly offset so as to project the frames in slightly relatively offset positions as schematically shown in Fig. 5.

However, since the polarized elements 38 and 39 are polarized in opposite directions, first one frame will be rejected by the polarizing element 38 so that the frame is thrown through the polarizing element 39, and the following instant the next polarized frame of the standard motion picture film will be rejected by the polarizing element 39 and will be passed by the polarizing element 38 so that each frame is thrown on the screen, but in a slightly offset position from the prior frame, offset first to the right and then to the left. The operation continues, and the frames offset to the right and the frames offset to the left will be in motion picture sequence, in relation to each other. It is necessary that these pictures be thrown upon a metallic surface screen. They may then be viewed with a polaroid viewer.

Figure 6:
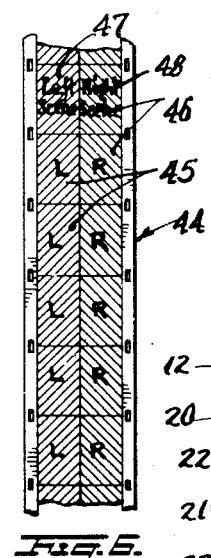
Fig. 6 is a fragmentary elevational view of a section of film constructed in accordance with a modified form of this invention.

In Figs. 5 and 6 another embodiment of the invention has been disclosed. In this form the moving picture film 44 is provided with adjacent pairs of side-by-side frames 45 and 46, comprising left and right scenes respectively. Each of these frames embodies a standard moving picture frame. The film 44 includes an entire series of these adjacent side-by-side frames 45 and 46 arranged one below the other. The frames 45 are polarized in one direction, as schematically indicated by the oblique lines 47 and the frames 46 are polarized in the other direction, as indicated by the oblique lines 48.

It is proposed that the frames 45 and 46 be projected in slightly offset positions, as schematically shown in Fig. 7, and indicated by the numerals 45' and 46'. It is proposed that these projected right and left scenes, be offset a distance substantially equal of the distance between the human eyes by the prism combination.

The polaroid viewer is also provided with polarizing elements so that the frames to the right are seen with one eye, and the frames to the left are seen with the other eye. The combined effect is to produce a three dimensional motion picture effect. It will therefore be seen that by using standard motion picture film it is possible to view the motion pictures with a three dimensional effect.

The prism system may be used to project standard motion picture films taken with the conventional camera to give an illusion of depth, in which case the polaroid belt is not used, but the picture is viewed through the usual polarized viewer.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

In a device for projecting three dimensional effect pictures from standard motion picture film, comprising a motion picture projector having an apertured gate, a sprocket wheel, and a lens, said film passing from one side of said wheel through said gate to the other side of said wheel, an endless belt of polarized film mounted within the loop of said standard film and passing through said gate and over said wheel with said standard film, said polarized film having frames aligned with the frames of said standard film at said aperture in said gate, alternate frames of said polarized film being polarized in one direction and the remaining frames in another direction, the adjacent frames of said polarized film being polarized at right angles to each other and at a forty-five degree inclination, and a prism assemblage on the side of said lens remote from said films, said assemblage including a large prism adjacent said lens and two small offset prisms aligned with said large prism and polarized for selecting said polarized frames and throwing adjacent frames in slightly laterally offset positions in relation to each other on the screen.

STANLEY YAROSH.

REFERENCES CITED

The following references are of record in the file of this patent:

UNITED STATES PATENTS

| Number | Name | Date |
| --- | --- | --- |
| 1,879,793 | Chubb | Sept. 27, 1932 |
| 2,222,300 | Pistor et al. | Nov. 19, 1940 |
| 2,241,041 | Sauer | May 6, 1941 |
| 2,282,947 | Sherbinin | May 12, 1942 |
| 2,348,410 | Pastor | May 8, 1944 |

FOREIGN PATENTS

| Number | Country | Date |
| --- | --- | --- |
| 519,488 | British | Mar. 28, 1940 |
| 555,670 | British | Sept. 2, 1943 |
| 850,724 | French | Sept. 18, 1939 |